(12) United States Patent
Schmidt et al.

(10) Patent No.: US 9,744,875 B2
(45) Date of Patent: Aug. 29, 2017

(54) MOTOR VEHICLE, BATTERY, AND METHOD FOR CONTROLLING A BATTERY

(71) Applicants: Robert Bosch GmbH, Stuttgart (DE); Samsung SDI Co., Ltd., Yongin-si, Gyeonggi-do (KR)

(72) Inventors: Ralph Schmidt, Weinstadt (DE); Dirk Hasenkopf, Stuttgart (DE); Stefan Butzmann, Beilstein (DE); Holger Fink, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/369,798

(22) PCT Filed: Dec. 11, 2012

(86) PCT No.: PCT/EP2012/075062
§ 371 (c)(1),
(2) Date: Jun. 30, 2014

(87) PCT Pub. No.: WO2013/107567
PCT Pub. Date: Jul. 25, 2013

(65) Prior Publication Data
US 2014/0358350 A1    Dec. 4, 2014

(30) Foreign Application Priority Data

Jan. 17, 2012   (DE) .......................... 10 2012 200 577

(51) Int. Cl.
*B60L 11/18*   (2006.01)
*B60L 3/00*    (2006.01)
(Continued)

(52) U.S. Cl.
CPC ......... *B60L 11/1866* (2013.01); *B60L 3/0046* (2013.01); *B60L 11/1853* (2013.01);
(Continued)

(58) Field of Classification Search
CPC   B60L 3/0046; B60L 11/1851; B60L 11/1853; B60L 11/1864; B60L 11/1866;
(Continued)

(56) References Cited

U.S. PATENT DOCUMENTS 7,522,435 B2 *  4/2009  Kohnotoh et al. .............. 363/71
7,786,699 B2 *  8/2010  Demers et al. ................. 320/133
(Continued)

FOREIGN PATENT DOCUMENTS

DE   10 2010 027 869 A1   10/2011
DE   10 2011 075 376 A1   11/2012
WO     2006/134047 A1    12/2006

OTHER PUBLICATIONS

International Search Report corresponding to PCT Application No. PCT/EP2012/075062, dated Oct. 22, 2013 (German and English language document) (5 pages).

*Primary Examiner* — Jerrah Edwards
*Assistant Examiner* — Tamara Weber
(74) *Attorney, Agent, or Firm* — Maginot, Moore & Beck LLP (57) ABSTRACT

A battery comprises a number n of battery module strings, wherein n is a natural number greater than or equal to two. The battery module strings have several battery modules, and one battery module has a coupling unit. The coupling unit is configured as a voltage transformer and couples the battery modules to each other. A method of controlling the battery includes supplying a load connected to the battery with a predefined and substantially constant total power. The total power corresponds to a sum of n individual powers of the n battery module strings. The method further includes setting n−1 string voltages, which are each present at the n−1 battery module strings, according to the total power, the load, and by defining a string voltage present at an nth (Continued)

battery module string with amplitude and phase position. At least two of the n individual powers are asymmetrical to each other.

9 Claims, 7 Drawing Sheets

(51) Int. Cl.
  *H02J 7/00* (2006.01)
  *H01M 10/42* (2006.01)
  *H01M 10/44* (2006.01)

(52) U.S. Cl.
  CPC ..... *B60L 11/1864* (2013.01); *H01M 10/4207* (2013.01); *H01M 10/4257* (2013.01); *H02J 7/0019* (2013.01); *B60L 2240/547* (2013.01); *B60L 2240/549* (2013.01); *H01M 10/441* (2013.01); *H01M 2010/4271* (2013.01); *Y02T 10/7005* (2013.01); *Y02T 10/7011* (2013.01); *Y02T 10/7055* (2013.01); *Y02T 10/7061* (2013.01)

(58) Field of Classification Search
  CPC ............ B60L 11/1868; B60L 2240/547; B60L 2240/549; H02J 7/0019; H01M 10/441; H01M 10/4207; H01M 10/4257; H01M 2010/4271; Y02T 10/7005; Y02T 10/7061; Y02T 10/7011; Y02T 10/7055
  See application file for complete search history.

(56) References Cited

U.S. PATENT DOCUMENTS

| | | | |
|---|---|---|---|
| 2005/0084745 A1* | 4/2005 | Colello et al. | 429/61 |
| 2009/0044996 A1* | 2/2009 | Frank | 180/65.29 |
| 2010/0171472 A1* | 7/2010 | Angquist | 323/207 |
| 2011/0025124 A1* | 2/2011 | Brabec | 307/9.1 |
| 2011/0089763 A1* | 4/2011 | Svensson et al. | 307/80 |
| 2011/0100735 A1 | 5/2011 | Flett | |
| 2011/0140530 A1* | 6/2011 | Demetriades et al. | 307/77 |
| 2011/0223506 A1* | 9/2011 | Lienkamp et al. | 429/432 |

* cited by examiner

MOTOR VEHICLE, BATTERY, AND METHOD FOR CONTROLLING A BATTERY

This application is a 35 U.S.C. §371 National Stage Application of PCT/EP2012/075062, filed on Dec. 11, 2012, which claims the benefit of priority to Serial No. DE 10 2012 200 577.3, filed on Jan. 17, 2012 in Germany, the disclosures of which are incorporated herein by reference in their entirety.

The present disclosure relates to a method for controlling a battery. The disclosure also relates to a battery comprising a number of n battery module strings, wherein n is a natural number and is greater than or equal to two. The battery module strings have a plurality of battery modules, wherein a battery module has a coupling unit. The coupling unit acts as a voltage converter and couples the battery modules to one another. The battery is connected to a load and supplies same with a predetermined and substantially constant total power, which corresponds to the sum of n individual powers of the n battery string modules. The disclosure also relates to a motor vehicle having an electric drive motor for driving the motor vehicle, which electric drive motor is connected to the battery.

BACKGROUND

The trend is that, in the future, battery systems will increasingly be used both in stationary applications, for example wind turbines, and in vehicles, such as hybrid and electric vehicles. In order to be able to meet the requirements placed on voltage and available power as set for a respective application, it is known practice for a high number of battery cells to be connected in series. Since the current provided by such a battery needs to flow through all of the battery cells and a battery cell can only conduct a limited current, additional battery cells are often connected in parallel.

Figure 1:
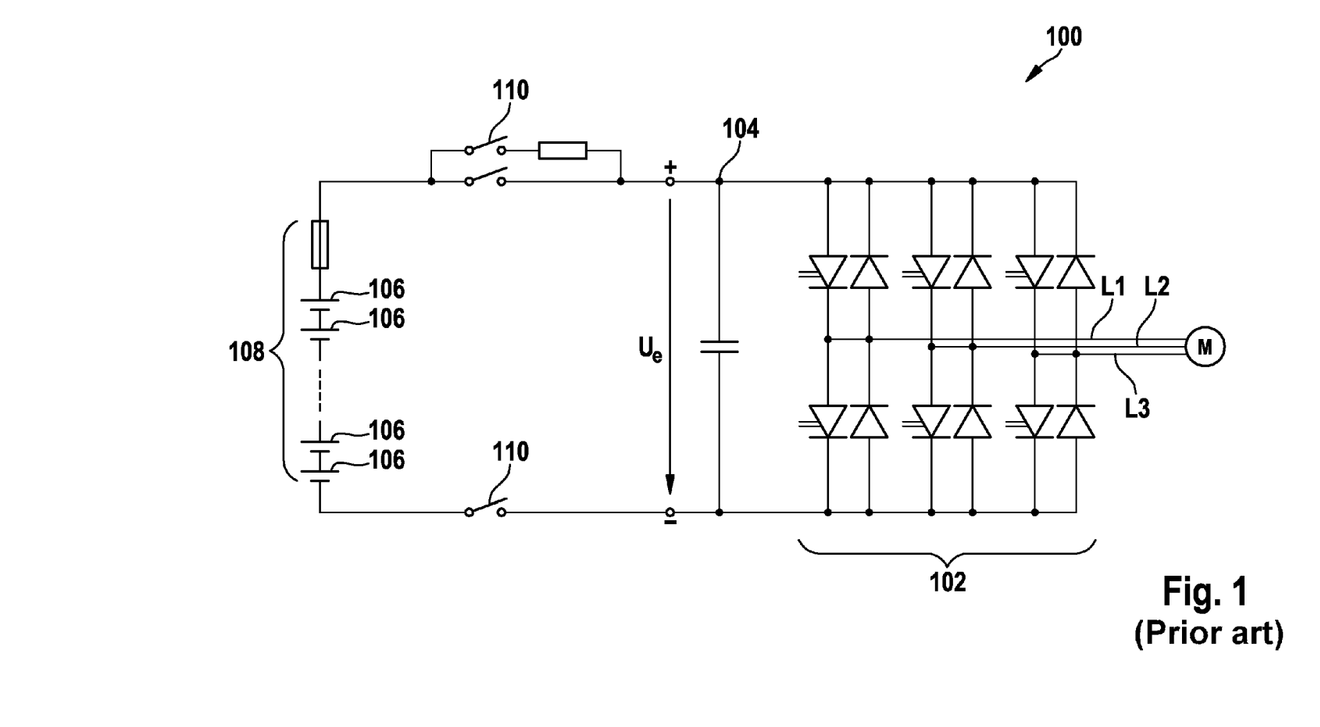
FIG. 1 shows a drive system known from the prior art.

FIG. 1 shows a known drive system 100, as is used in electric and hybrid vehicles. The drive system 100 comprises an electric motor M which is connected via three phases L1, L2, L3, also known as conductors or outer conductors, to a pulse-controlled inverter 102. The pulse-controlled inverter 102 comprises a plurality of semiconductor switching elements and is distinguished in that it can convert a DC input voltage $U_e$ into a three-phase output voltage which is present between the three phases L1, L2, L3. A DC-voltage intermediate circuit 104 is connected upstream of the pulse-controlled inverter 102, which DC-voltage intermediate circuit buffers, inter alia, the energy peaks which are briefly necessary, for example in the case of a starting process of the electric motor M. A battery 108 having a plurality of series-connected battery cells 106 is connected to the DC-voltage intermediate circuit 104 via a charging and disconnecting device 110. The charging and disconnecting device 110 comprises switching elements at the plus and minus pole of the battery 108 in order to disconnect said battery from the rest of the circuit, for example in the event of a fault.

Figure 2:
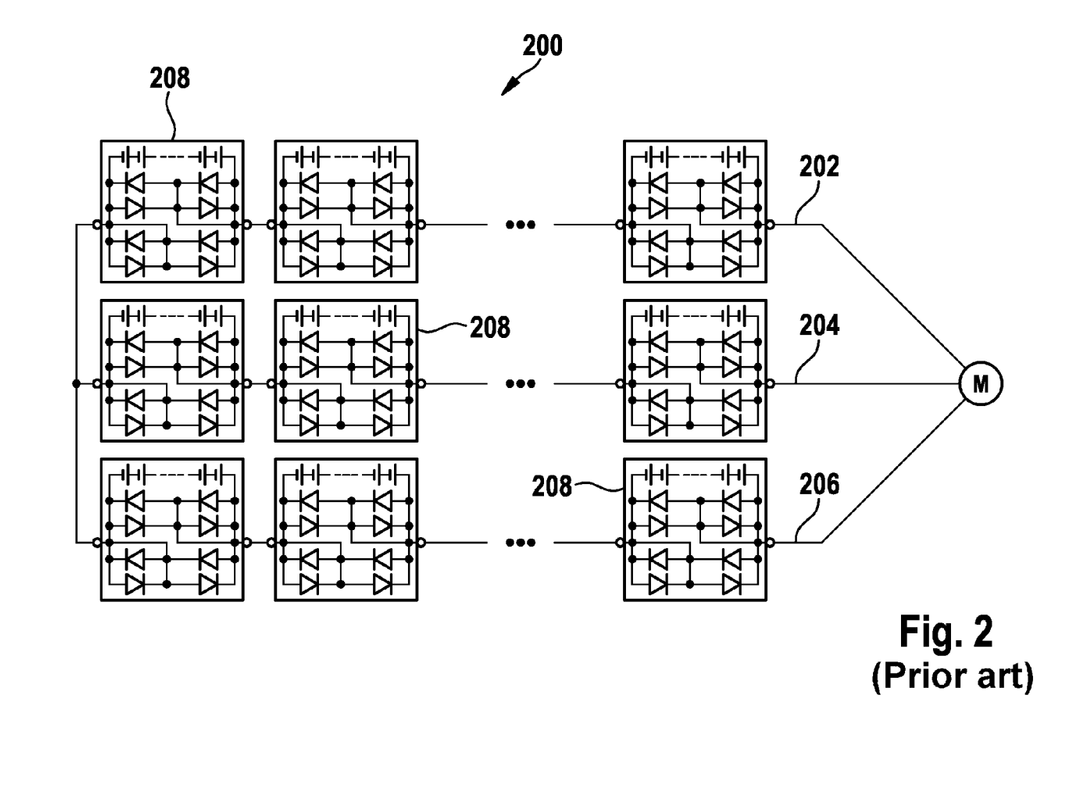
FIG. 2 shows a battery known from the prior art.

Furthermore, a method for controlling a battery 200 is known from DE 10 2011 075 376. As shown in FIG. 2, the battery 200 consists of battery module strings 202, 204, 206 which in each case comprise a plurality of battery modules 208 which are coupled to one another. Each battery module 208 comprises a plurality of series-connected battery cells which are connected to a coupling unit. According to the known method, the coupling unit can couple the battery modules 208 to one another in selectable polarity and, moreover, acts as a pulse-controlled inverter. The battery module strings 202, 204, 206 shown in FIG. 2 correspond to three phases and supply an electric motor M with balanced power in a conventional manner, that is to say each phase supplies a third of the total power. Homogeneous states of charge between the individual battery cells or battery modules are necessary for this purpose in conventional battery systems of this type since the total power is dependent on the weakest battery module.

SUMMARY

A method for controlling a battery is specified according to the disclosure. The battery comprises a number of n battery module strings which have a plurality of battery modules, wherein a battery module has a coupling unit, wherein n is a natural number and is greater than or equal to two. The coupling unit acts as a voltage converter and couples the battery modules to one another.

The method according to the disclosure for controlling the battery comprises, in principle, the following steps:

supplying a load, which is connected to the battery, with a predetermined and substantially constant total power, wherein the total power corresponds to the sum of n individual powers of the n battery module strings, adjusting n−1 string voltages, which correspond in each case to the n−1 battery module strings, by the total power, the load and by setting a string voltage present at the nth battery module string with amplitude and phase relation, wherein at least two of the n individual powers are unbalanced with respect to one another.

According to the disclosure, a battery is configured to perform the method according to the disclosure. In addition a motor vehicle is provided which comprises an electric drive motor for driving the motor vehicle, which electric drive motor is connected to the battery.

The method according to the disclosure has the advantage that in the event of a failure of individual battery modules, the total power, in particular the active power, which is output to the load can be kept constant. Furthermore, the method according to the disclosure makes it possible to charge individual battery module strings while other battery module strings are discharged. Hence, the method, the battery and the motor vehicle can contribute to a higher operational safety and reliability. Even the efficiency of the battery is improved since the battery module strings can also output their power in an unbalanced manner and thus the output total power of the battery is not dependent on the battery module string which is weakest in terms of power.

According to another embodiment, a battery module can comprise at least one battery cell, in particular a lithium-ion battery cell, which is connectable to the coupling unit. Preferably, the battery module comprises a plurality of series-connected or parallel-connected or mixed series- and parallel-connected lithium-ion battery cells. One advantage of a plurality of identical battery modules is substantially in the redundancy thereof, that is to say if one battery cell fails, only the respective battery module thereof is affected and not the battery as a whole. In this case, for example by control by a battery management unit or independently, the coupling unit can disconnect and, as a result, bridge a defective battery cell or the corresponding battery module.

According to another embodiment, the battery modules of the n battery module strings can in each case be connected in series. As a result, the output voltages of the battery modules of a series-circuit can be summed to a higher string voltage.

According to another embodiment, the method makes it possible to charge one of the n battery module strings from the other battery module strings via the load. In particular, a plurality of battery module strings can be charged from one or more other battery module strings via the load.

The coupling unit of each battery module comprises in particular a plurality of semiconductor switching elements. By way of example, the coupling unit can be designed such that it outputs a positive battery module voltage and optionally a voltage of 0 volt. Alternatively, the coupling unit can be configured such that it outputs a positive battery module voltage, a negative battery module voltage and a voltage of 0 volt. In particular, the coupling unit is actuated in this case by a battery management unit in order to be able to generate discrete voltage potentials of variable pulse widths, also known as pulse-width modulation. The coupling unit can convert the DC voltage supplied from the battery cells on average into an AC output voltage by pulse-width modulation. In this case, the coupling unit operates, for example, in the so-called chopper mode and chops or commutates the DC voltage at high frequency.

According to another embodiment, the n battery module strings can form a polyphase system, wherein a battery module string in each case can correspond to a phase. A phase, also called outer conductor or pole conductor, can be any electrically conductive part which is subject to a voltage during operation and is not a neutral conductor. Known polyphase systems generally provide the same and therefore balanced power in each phase. By contrast, the method, the battery and the motor vehicle according to the disclosure enable different, that is to say unbalanced, powers in the phases.

According to another embodiment, n equals three battery module strings can form a three-phase system which is connectable to a load designed as a three-phase machine. Three-phase machines, for example conventional electric motors, often have three connections for a three-phase alternating current. In particular, the battery forms a three-phase system, wherein three battery module strings thereof are in each case connectable to the three connections of a three-phase machine of this type. As a result, the method and the battery according to the disclosure enable an advantageous compatibility with conventional three-phase machines.

Equipping a motor vehicle with the battery according to the disclosure can improve the reliability of the vehicle drive system and lead to a larger range despite any battery module faults or the like, since the battery module strings can be discharged in an unbalanced manner.

BRIEF DESCRIPTION OF THE DRAWINGS

Exemplary embodiments of the disclosure are explained in more detail with reference to the drawings and the following description. In the drawings.

DETAILED DESCRIPTION

Figure 3:
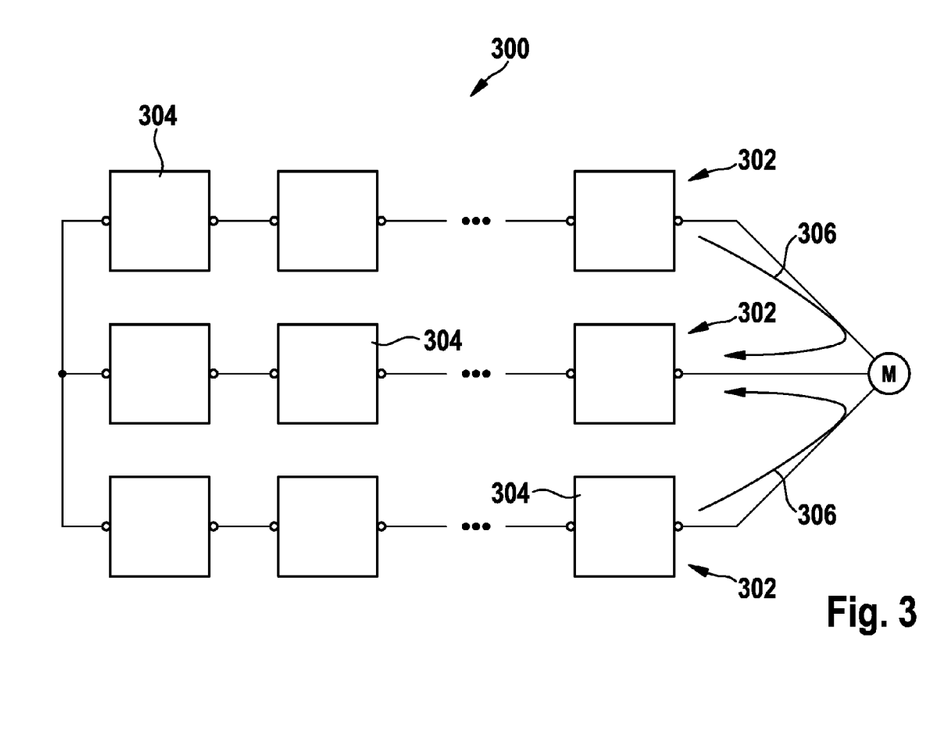
FIG. 3 shows a method for controlling a battery according to the disclosure.

FIG. 3 shows a method for controlling a battery 300. The battery 300 comprises three battery module strings 302. The battery module strings 302 have in each case a plurality of battery modules 304.

Each battery module string 302 can be defined as a phase, also called outer conductor or pole conductor. Thus, the three battery module strings 302 form a three-phase system. Each battery module string 302 supplies a string voltage with amplitude and phase relation, that is to say an AC voltage, and an individual power.

The battery module strings 302 are connected via three connection lines to an electric motor M which forms a load. In this case, a method for controlling the battery 300 comprises the following steps.

The electric motor M connected to the battery 300 is supplied with a predetermined and substantially constant total power. The total power corresponds to the sum of the three individual powers of the battery module strings 302.

A further step of the method comprises adjusting two of the three string voltages which are present in each case at two battery module strings 302 by means of a predefined total power, the electrical behavior of the electric motor M and setting a third string voltage, with amplitude and phase relation, present at the third battery module string. In this case, the three output individual powers are unbalanced with respect to one another.

The imbalance in the individual powers compensates for weaknesses in the third phase or the third battery module string 302 the string voltage of which is set to a low level, for example by low states of charge in the battery cells of the battery modules 304. The first and second phase compensate for the low state of charge of the third phase, wherein the first and second phase are discharged and energy flows into the weaker third phase via the electric motor M, that is to say said third phase is charged, as is shown in FIG. 3 by two arrows 306. This increases the safety and reliability of the battery 300. In addition, the energy of the battery 300 can be better used since the total power thereof is not dependent on the phase which is weakest in terms of power.

Figure 4:
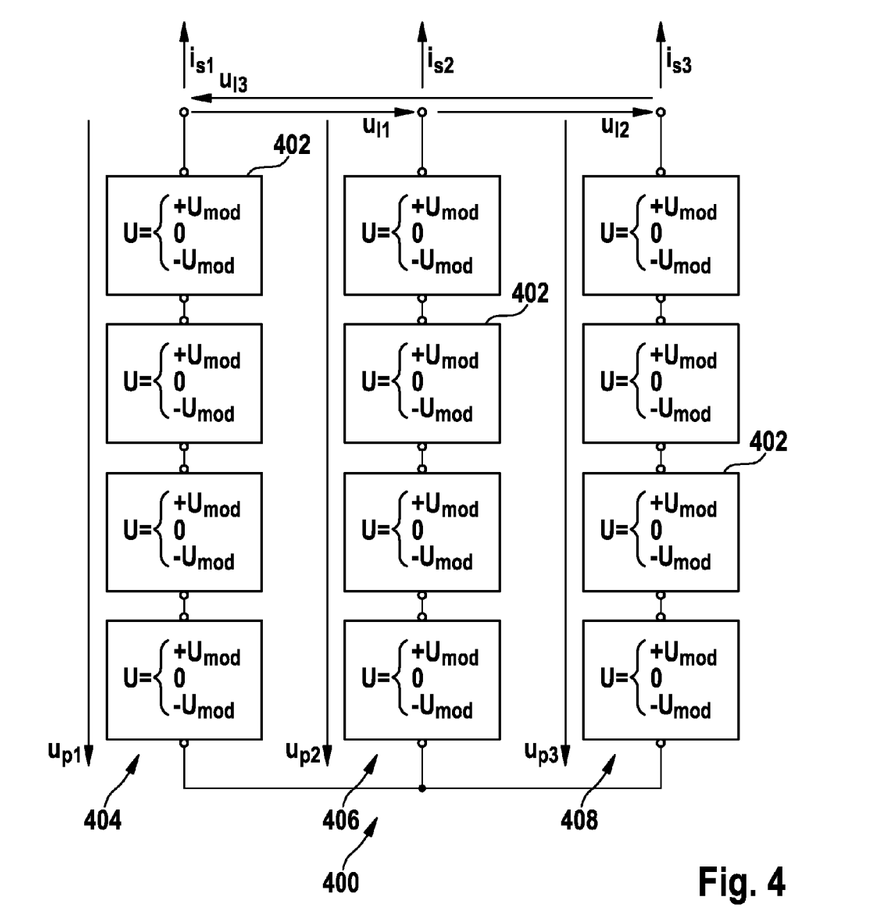
FIG. 4 shows a battery according to the disclosure.

FIG. 4 shows a battery 400 which comprises a plurality of battery modules 402, wherein each four series-connected battery modules 402 form one of three battery module strings 404, 406, 408. Each battery module 402 comprises a coupling unit—not shown—which acts as inverter and couples the battery modules 402 to one another. Each coupling unit converts a DC voltage from lithium-ion battery cells—not shown—on average into an AC voltage. The AC voltage occurs by chopping the DC voltage in the manner of a pulse-width modulation. Output voltage levels $+U_{mod}$, which corresponds to the positive lithium-ion battery cell voltage, 0 volt, and $-U_{mod}$, which corresponds to the negative lithium-ion battery cell voltage, occur.

The three battery module strings 404, 406, 408 form a three-phase system. A voltage present between two battery module strings 404, 406, 408 is defined as conductor voltage or outer conductor voltage $u_{l1}$, $u_{l2}$, $u_{l3}$, as is shown in FIG. 4. Each battery module string supplies a string current $i_{s1}$, $i_{s2}$ or $i_{s3}$. The voltage present across four series-connected battery modules 402 of each battery module string 404, 406 or 408 is defined as string voltage or output voltage potential $u_{p1}$, $u_{p2}$ or $u_{p3}$.

Figure 9:
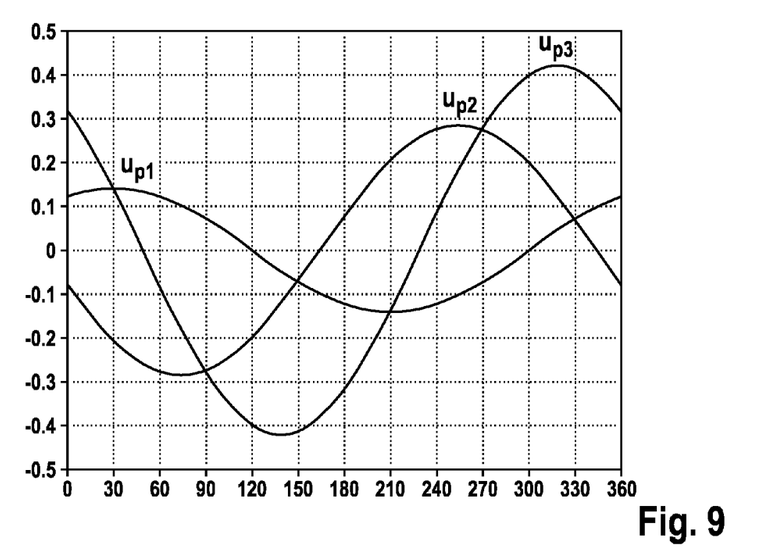
FIG. 9 shows a graph with unbalanced output potentials according to the disclosure.
Figure 10:
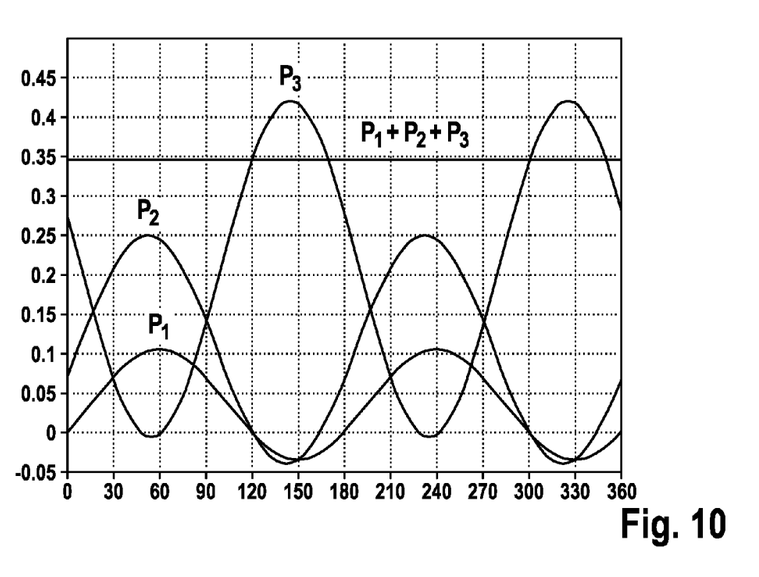
FIG. 10 shows a graph with unbalanced powers according to the disclosure.

FIGS. 5 to 8 show graphs of output variables of conventional control methods for three-phase systems, wherein, for this conventional example, an active power is output to a load. FIGS. 9 and 10 show graphs of output variables of a control method according to an exemplary embodiment of the disclosure.

The horizontal x axes of the graphs shown in FIGS. 5 to 10 designate in each case a phase angle of from 0 to 360 degrees.

Figure 5:
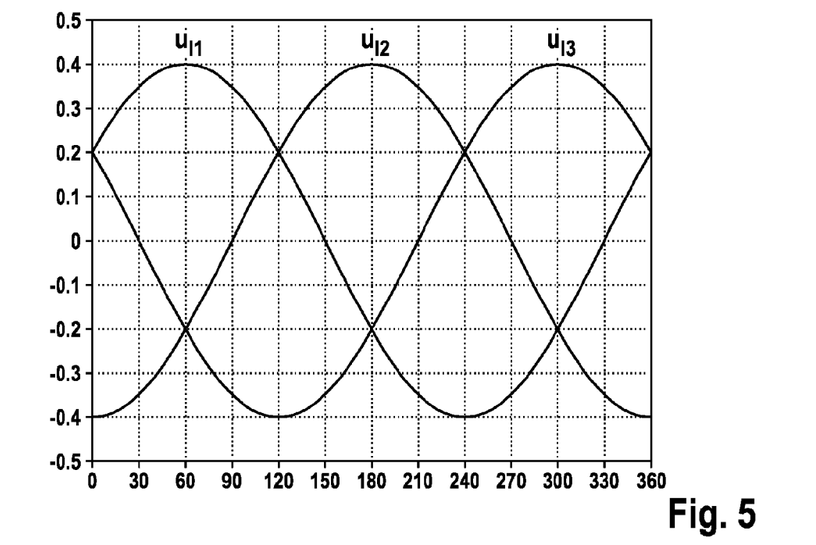
FIG. 5 shows a graph with known balanced voltages.
Figure 6:
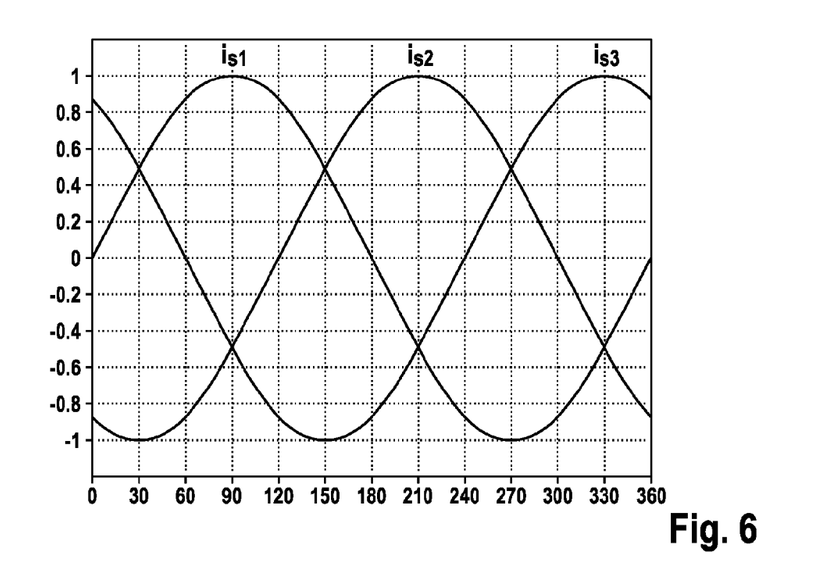
FIG. 6 shows a graph with known balanced currents.
Figure 7:
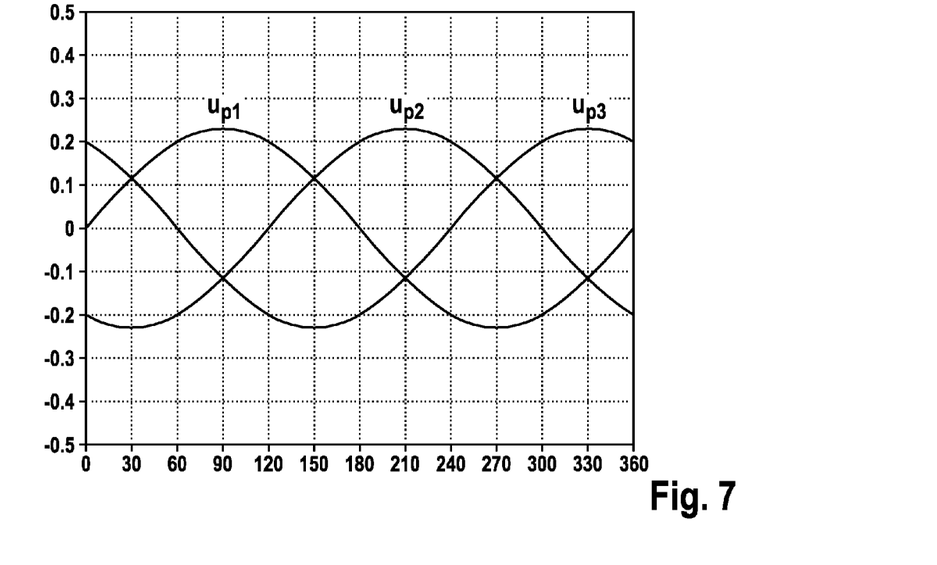
FIG. 7 shows a graph with known balanced output potentials.
Figure 8:
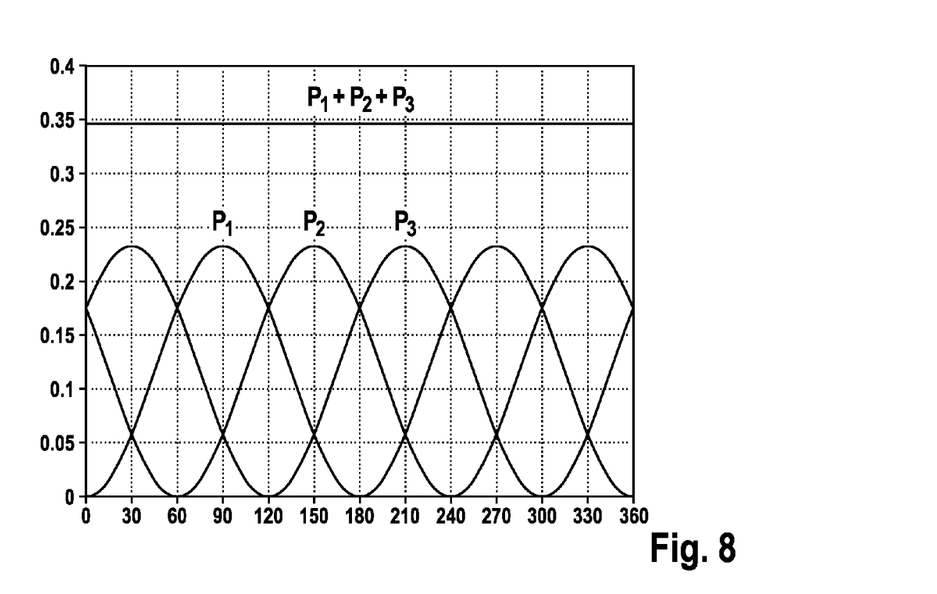
FIG. 8 shows a graph with known balanced powers.

FIG. 5 shows a conventional profile of three conductor voltages $u_{f1}$, $u_{f2}$, $u_{f3}$. The three string voltages are sinusoidal and have the same amplitude and in each case a phase shift of 120 degrees with respect to one another; that is to say, they are balanced. FIG. 6 shows a conventional profile of the three string currents $i_{s1}$, $i_{s2}$, $i_{s3}$. Said string currents are also sinusoidal and have the same amplitude and in each case a phase shift of 120 degrees with respect to one another; they are also balanced. The string voltages or output potentials $u_{p1}$, $u_{p2}$, $u_{p3}$ run in an identical, known manner in FIG. 7, that is to say in each case the same amplitude and phase shift of 120 degrees. As a result, a conventional control method supplies sinusoidal individual powers $P_1$, $P_2$, $P_3$ which in each case have a phase shift of 120 degrees and the same amplitude; even the individual powers are therefore balanced. The sum of the individual powers $P_1+P_2+P_3$ amounts to a constant total power at a load.

FIGS. 9 and 10 show a method in which a constant total power $P_1+P_2+P_3$ is achieved again. The individual powers $P_1$, $P_2$ and $P_3$ are unbalanced in this case, however. In FIG. 10, $P_1$ is equal to 10% of the total power, $P_2$ is equal to 30% of the total power and $P_3$ is equal to 60% of the total power. The string voltages or output potential $u_{p1}$, $u_{p2}$, $u_{p3}$ are adjusted by means of the method. Now, they no longer have a constant amplitude and do not have a balanced phase shift of 120 degrees, as in FIG. 7.

The described method can be implemented analogously for n phases and is described in general terms as follows. To adjust desired conductor voltages, n−1 freely adjustable string voltages are required, that is to say a string voltage can be arbitrarily predefined in terms of size and phase or amplitude and phase relation. With these two degrees of freedom, two power variables can be freely adjusted in the case of a given power output, wherein the power output is determined by the conductor voltages and a load connected thereto. Thus, for example, the active power can be arbitrarily adjusted in two phases, for example, arbitrary power output or even power input in two phases. If the one string voltage is set by predefining the powers in terms of amplitude and phase relation, the string voltages of the n−1 remaining phases are set via the predefined conductor voltages. Hence, even the remaining set power variables are set via the given total power.

The invention claimed is:

1. A method for controlling a battery comprising a number n of battery module strings which have a plurality of battery modules, each battery module having a coupling unit configured as a voltage converter and configured to couple the battery modules to one another, the method comprising:
supplying a load, which is connected to the battery, with a predetermined and substantially constant total power, the total power corresponding to a sum of n individual powers of the n battery module strings; and
adjusting n−1 string voltages which are present in each case at n−1 battery module strings, by the total power, the load and by setting a string voltage present at an nth battery module string with amplitude and phase relation,
wherein at least two of the n individual powers are unbalanced with respect to one another, and
wherein n is a natural number and is greater than or equal to two.

2. The method as claimed in claim 1, wherein one of the n battery module strings is charged by the other battery module strings via the load.

3. A battery comprising:
a number n of battery module strings which have a plurality of battery modules, each battery module having a coupling unit configured as a voltage converter and configured to couple the battery modules to one another,
wherein n is a natural number and is greater than or equal to two,
wherein the battery is configured to supply a connected load with a predetermined and substantially constant total power which corresponds to a sum of n individual powers of the n battery module strings,
wherein the battery is configured to adjust n−1 string voltages which are present in each case at the n−1 battery module strings, by the total power, the connected load, and by setting a string voltage present at an nth battery module string with amplitude and phase relation, and
wherein at least two of the n individual powers are unbalanced with respect to one another.

4. The battery as claimed in claim 3, wherein the coupling unit is further configured such that either (i) a positive battery module voltage and a voltage of 0 volt can optionally be output, or (ii) a positive battery module voltage, a negative battery module voltage, and a voltage of 0 volt can be output.

5. The battery as claimed in claim 3, wherein:
the n battery module strings form a polyphase system, and
a battery module string in each case corresponds to a phase.

6. The battery as claimed in claim 3, wherein n equals three battery module strings configured to form a three-phase system, which is connected to a load configured as a three-phase machine.

7. The battery as claimed in claim 3, wherein the battery module comprises at least one battery cell, which is connected to the coupling unit.

8. The battery as claimed in claim 3, wherein the battery modules of the n battery module strings are in each case connected in series.

9. A motor vehicle comprising:
an electric drive motor configured to drive the motor vehicle; and
a battery connected to the electric drive motor, the battery including a number n of battery module strings which have a plurality of battery modules each battery module having a coupling unit configured as a voltage converter and configured to couple the battery modules to one another,
wherein n is a natural number and is greater than or equal to two,
wherein the battery is configured to supply a connected load with a predetermined and substantially constant total power which corresponds to a sum of n individual powers of the n battery module strings,
wherein the battery is configured to adjust n−1 string voltages which are present in each case at the n−1 battery module strings, by the total power, the connected load, and by setting a string voltage present at an nth battery module string with amplitude and phase relation, and wherein at least two of the n individual powers are unbalanced with respect to one another.

* * * * *